United States Patent
Alonso Garcia et al.

(10) Patent No.: US 12,159,122 B2
(45) Date of Patent: Dec. 3, 2024

(54) ELECTRONIC DEVICE, METHOD AND COMPUTER PROGRAM

(71) Applicant: Sony Group Corporation, Tokyo (JP)

(72) Inventors: Javier Alonso Garcia, Stuttgart (DE); Fabien Cardinaux, Stuttgart (DE); Thomas Kemp, Stuttgart (DE); Lukas Mauch, Stuttgart (DE); Stefan Uhlich, Stuttgart (DE); Stephen Tiedemann, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 375 days.

(21) Appl. No.: 17/635,704

(22) PCT Filed: Aug. 11, 2020

(86) PCT No.: PCT/EP2020/072525
§ 371 (c)(1),
(2) Date: Feb. 16, 2022

(87) PCT Pub. No.: WO2021/037559
PCT Pub. Date: Mar. 4, 2021

(65) Prior Publication Data
US 2022/0284196 A1    Sep. 8, 2022

(30) Foreign Application Priority Data
Aug. 23, 2019 (EP) ..................... 19193322

(51) Int. Cl.
*G06F 40/58* (2020.01)
*G06F 40/30* (2020.01)
*G06N 3/08* (2023.01)

(52) U.S. Cl.
CPC .............. *G06F 40/58* (2020.01); *G06F 40/30* (2020.01); *G06N 3/08* (2013.01)

(58) Field of Classification Search
CPC ............ G06F 40/58; G06F 40/30; G06N 3/08
See application file for complete search history.

(56) References Cited

U.S. PATENT DOCUMENTS

| | | | |
|---|---|---|---|
| 8,660,836 B2 | 2/2014 | Castelli et al. | |
| 2007/0016401 A1* | 1/2007 | Ehsani | G06F 40/55 704/9 |
| 2008/0120092 A1* | 5/2008 | Moore | G06F 40/45 704/4 |

(Continued)

FOREIGN PATENT DOCUMENTS

| | | | |
|---|---|---|---|
| CN | 105843801 A | 8/2016 | |
| CN | 108829685 A | 11/2018 | |

OTHER PUBLICATIONS

International Search Report and Written Opinion mailed on Oct. 28, 2020, received for PCT Application PCT/EP2020/072525, Filed on Aug. 11, 2020, 11 pages.

(Continued)

*Primary Examiner* — Fan S Tsang
*Assistant Examiner* — David Siegel
(74) *Attorney, Agent, or Firm* — XSENSUS LLP

(57) ABSTRACT

A method comprising a deep learning based translation system translating a source sentence from language A to a target sentence in language B, placing constraints on the target sentence in language B.

20 Claims, 13 Drawing Sheets

(56) References Cited

U.S. PATENT DOCUMENTS

| | | |
|---|---|---|
| 2008/0208565 A1 | 8/2008 | Bisegna |
| 2010/0076746 A1 | 3/2010 | Aikawa et al. |
| 2015/0046148 A1* | 2/2015 | Oh .......................... G06F 40/58 704/3 |
| 2016/0314116 A1* | 10/2016 | Kamatani ............. G06F 40/216 |
| 2020/0192985 A1* | 6/2020 | Na .......................... G06F 40/55 |
| 2021/0027761 A1* | 1/2021 | Witherspoon ......... G06N 3/045 |
| 2021/0027784 A1* | 1/2021 | Li ........................ G10L 15/183 |

OTHER PUBLICATIONS

Creswell et al., "Generative Adversarial Networks: An Overview", IEEE-SPM, arXiv:1710.07035v1 [cs.CV], Apr. 2017, 14 pages.

Lample et al., "Unsupervised Machine Translation Using Monolingual Corpora Only", ICLR, arXiv:1711.00043v2 [cs.CL], 2018, 14 pages.

Voita et al., "When a Good Translation is Wrong in Context: Context-Aware Machine Translation Improves on Deixis, Ellipsis, and Lexical Cohesion", 2019, 16 pages.

Sennrich et al., "Controlling Politeness in Neural Machine Translation via Side Constraints", Proceedings of the 2016 Conference of the North American Chapter of the Association for Computational Linguistics: Human Language Technologies, 2016, 6 pages.

* cited by examiner

My name is Bond. ⟶ 
My    -> x(1) =    [1,0,...,0,0]
name -> x(2) =    [0,..1,0,...0]
is    -> x(3) =    [0,..1,0,...0]
Bond -> x(4) =    [ 0,..1,0,...0]
.    -> x(5) =    [0,0,...,1]

Fig. 5

ELECTRONIC DEVICE, METHOD AND COMPUTER PROGRAM

CROSS-REFERENCE TO RELATED APPLICATIONS

The present application is based on PCT/EP2020/072525 filed on Aug. 11, 2020, and claims priority to EP 19193322.5 filed on Aug. 23, 2019, the entire contents of each are incorporated herein by reference.

TECHNICAL FIELD

The present disclosure generally pertains to the field of natural language processing, in particular to devices, methods and systems for language to language translation with additional constraints.

TECHNICAL BACKGROUND

Machine translation is a sub-field of computational linguistics that is directed to the use of computer programs to translate text or speech from one language to another, not changing the meaning of the given sentence.

In recent years, approaches had shifted from classical statistical machine translation methods to neural machine translation (NMT). NMT use large artificial neural networks to predict the likelihood of a sequence of words. The simplest form of machine translation performs a word based substitution, meaning that the translation system does not make use of the context to find the closest translation of a sentence from the source language A to a sentence in the target language B. Recurrent Neural Networks (RNN) are a special type of neural networks with loops that allow information to persist throughout different steps. Therefore, RNN can be used to build NMT systems which can use the context around a single word to produce a good translation.

Further, a special architecture of RNNs are Long Short Term Memory (LSTM) networks. Theses LSTM units solve the practical problem of vanishing gradients during back-propagation and are commonly used in NMT systems. For an implementation of a LSTM encoder/decoder network for machine translation see for example Wu et al. in "Google's Neural Machine Translation System: Bridging the Gap between Human and Machine Translation", arXiv: 1609.08144 [2016]. A disadvantage of theses supervised learning approaches is that they can only provide a single best translation for each possible input sentence, which is implicitly defined by a parallel training corpora. Accordingly, it is desirable to provide improved electronic devices, methods, and computer programs for machine translation.

SUMMARY

According to a first aspect the disclosure provides a computer-implemented method comprising training a deep learning based translation system to translate an input sentence from a first language into a target sentence in a second language, the training including a constraint on the target sentence in the second language.

According to a further aspect the disclosure provides an electronic device comprising circuitry configured to translate an input sentence from a first language into a target sentence in second language, the training including a constraint on the target sentence in the second language.

Further aspects are set forth in the dependent claims, the following description and the drawings.

BRIEF DESCRIPTION OF THE DRAWINGS

Embodiments are explained by way of example with respect to the accompanying drawings, in which:

FIG. 5 shows the result of one-hot using the dictionary of FIG. 4;

DETAILED DESCRIPTION OF EMBODIMENTS

Figure 1:
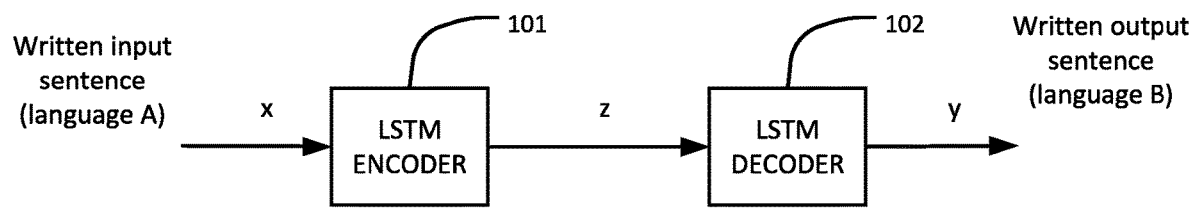
FIG. 1 shows a pipeline of a standard probabilistic deep learning based machine translation system which comprises of an LSTM (Long short-term memory) encoder network and of a LSTM decoder network (generator network), translating between language A and language B and trained with parallel corpora.

The embodiments described below in more detail disclose a method comprising training a deep learning based translation system to translate an input sentence from a first language into a target sentence in a second language, the training including a constraint on the target sentence in the second language.

A deep learning based translation system may be a machine translation system that uses artificial neural networks to predict the likelihood of a sequence of words, typically modeling entire sentences in a single model. The artificial neural network may comprise, for example, multilayer perceptrons, recurrent neural networks (RNNs), convolutional neural networks or the like.

A language may be any language spoken by humans at the present or at any time in the past, it may be a dialect or an artificial language, for example a machine readable language.

An input sentence may be a textual or spoken unit comprising one or more words in the first language that are grammatically linked which is given to the deep learning based translation system in order to be translated.

A target sentence may be a textual unit comprising one or more words in the second language that are grammatically linked which is received from the deep learning based translation system. It may have a similar (semantical) meaning as the input sentence.

A constraint on the target sentence may be, for example, any desired constraint on the target sentence concerning a selection of words, grammar, style of language, structure of sentence or the like. For example, this constraint may be configured to create a target sentence which is as short as possible (e.g., has the least number of words or letters), which may be important for (automatic) subtitle creation for videos. Alternatively, the constraint may have the aim that a target sentence is spoken with similar lip movements as the input sentence (for example, the constraint may relate to the number of syllables of the target sentence compared to that of the input sentence, or to a sequence of vocals of the target sentence). This may be important if a video is translated and a 1-to-1 correspondence of the lip movements to the spoken text may be desired.

The deep learning based translation system may comprise a first encoder/decoder pair which may be trained using a monolingual corpus for the first language, and a second encoder/decoder pair which is trained using a monolingual corpus for the second language. Each encoder and decoder may be a neural network and can therefore be referred to as encoder/decoder network.

A monolingual corpus may be a large and structured set of texts in a single language.

The first encoder may translate the input sentence in the first language to a latent representation, and the first decoder may translate a latent representation back to an input sentence in the first language. The second encoder may translate the target sentence in the second language to a latent representation, and the second decoder may translate a latent representation back to a target sentence in the second language.

A latent representation, also called a latent or hidden variable, may be a variable that is not directly measurable but is rather inferred by a statistical model. A latent variable may not correspond to a physical reality but rather represent an abstract concept. For example in case of machine translation, the input and output sentence may be variables that clearly correspond to a physical (measureable) reality (i.e. the set of languages A and B). The latent variable, working as the variable connecting the input and the output sentence, may be an abstract concept that captures the language independent information (i.e. the meaning) of the sentences and may therefore not be a directly measurable (and human-readable) variable. A latent variable may for example be an element of a latent space. For example, a given input sentence may be first encoded into a latent variable that captures all semantics. This latent representation may then be used to generate a target sentence in a different/same language, which may have exactly the same meaning and may meet additional constraints.

According to some embodiments, the encoder/decoder pairs may be trained using two independent monolingual corpora, one for the set of sentences of the first language and one for the set of sentences of the second language.

The monolingual corpora because the corpus in the second language is not necessarily a translation of the corpus in the first language.

According to some embodiments, the encoder/decoder pairs may be trained using a loss-function, which may have the purpose of mathematically representing the semantic difference between an input sentence and a target sentence. By minimizing the loss-function, the encoder/decoder pairs may learn to produce translations where the input sentence and the target sentence have the same meaning.

A loss-function, also called an objective function or cost function, may be a function that maps an event (or values of one or more variables) onto a real number representing some cost associated with the event (or values of the one or more variables). An optimization problem may seek to minimize this loss function. For example, that event may be the semantic difference between two sentences, and the optimization problem may seek to minimize the semantic difference between the two sentences by minimizing the loss functions.

According to some embodiments, the loss-function may, for example, comprise a reconstruction loss for the sentences of the first language, which relates an input sentence of the first language to a resulting sentence of the first language. During training, the resulting sentence may be obtained by the encoder network translating the input sentence to a latent representation and the decoder network translating this latent representation back to the first language.

Further, according to some embodiments, the loss-function may comprise a reconstruction loss for the sentences of the second language, which may relate a target sentence of the second language to a resulting sentence of the second language, whereby, during training, the resulting sentence is obtained by the encoder network translating the target sentence to a latent representation and the decoder network translating this latent representation back to the second language.

According to some embodiments, the loss-function comprises a cross-language loss for sentences of the first language, which may relate an input sentence of the first language to a resulting sentence of the first language, whereby during training, the resulting sentence may be obtained by the encoder network translating the input sentence to a latent representation, the decoder network translating this latent representation to a target sentence in the second language, the encoder network translating the target sentence to a latent representation and the decoder translating the latent representation back to the first language.

According to some embodiments, the loss-function comprises a cross-language loss for sentences of the second language, which may relate a target sentence of the second language to a resulting sentence of the second language, whereby, during training, the resulting sentence may be obtained by the encoder network translating the target sentence to a latent representation, the decoder network translating this latent representation to an input sentence in the first language, the encoder network translating the input sentence to a latent representation and the decoder translating the latent representation back to the second language. The cross-language loss term for sentences of the second language may have the purpose of mathematically representing the semantic difference between a target sentence from the second language and a resulting sentence from the second language (whereby the resulting sentence is obtained as explained above). By minimizing the cross-language loss term for sentences of the second, the encoder/decoder pairs may learn to produce translations where the target sentence and resulting sentence have the same meaning.

According to some embodiments, the loss-function may comprise a penalty term, wherein the penalty term may be imposed on a target sentence in the second language. The penalty term may be an implementation of the constraint.

During training, the target sentence may be obtained by the encoder network translating an input sentence to a latent representation and the decoder network translating this latent representation to the target sentence.

A penalty term may be a mathematical expression, for example a mathematical function, which is for example in an optimization problem added to a loss function of an optimization problem, to ensure that the optimization is directed towards a desired optimum. For example, a penalty term may be a step function which jumps from 0 to a constant value if the constraint is violated and which may be added to a loss function. It can for example be a step function which jumps to infinity when a certain number of words in a target sentence is surpassed in order to ensure that the optimization is directed towards a solution target sentence with less than a certain number of words.

According to some embodiments the penalty term may be realized by an indicator function.

An indicator function, which is also called characteristic function, is in general a function which is defined on a set X that indicates membership of an element in a subset A of X, having a predefined first value (e.g. the value, 1 or ∞) for all elements of X not in A and a predefined second value (e.g. the value 0) for all elements of A.

According to some embodiments, the first language and the second language may be different languages.

According to some embodiments, the first language and the second language may be the same language.

According to some embodiments, the constraint on the target sentence in the second language may be based on the number of words in the target sentence.

According to some embodiments, the constraint on the target sentence in the second language may be based on the number of syllables in the target sentence.

According to some embodiments, the constraint on the target sentence in the second language may relate to the target sentence being visualizable as easily as possible using a sign language. For example, to every word could be assigned a value representing the difficulty of the word expressed in sign language; for example the value one for very easy expressible words in sign language up to the value 10 for very difficult expressible words in sign language. The constraint related to the target sentence being visualizable as easily as possible may be imposed by trying to minimize the summed up values (representing the difficulty of the word expressed in sign language) of all words in the target sentence.

According to some embodiments, the constraint on the target sentence in the second language may be the target sentence having minimal similarity with other sentences with different meaning.

According to some embodiments, a circuitry may be trained to translate an input sentence from a first language into a target sentence in a second language, the training including a constraint on the target sentence in the second language.

Circuitry may include a processor, a memory (RAM, ROM or the like), a DNN unit, a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, etc.). A DNN unit may for example be realized by a GPU (graphics processing unit) which may increase the speed of deep-learning systems by about 100 times because the GPUs may be well-suited for the matrix/vector math involved in deep learning.

Embodiments are now described by reference to the drawings.

Encoder-Decoder Network for Machine Translation

A commonly used approach in machine translation using RNNs is the RNN encoder-decoder approach that comprises two RNNs that act as an encoder and a decoder pair.

FIG. 1 shows a pipeline of a standard probabilistic deep learning based machine translation system which comprises an LSTM (Long short-term memory) encoder network 101 and a LSTM decoder network 102 (generator network), translating between language A and language B and trained with parallel corpora. An input sentence x in language A is fed to the LSTM encoder network 101 which encodes the input sentence x into a latent representation z (sentence encoding/intermediate vector) which captures all language independent information (i.e. the meaning) of the input sentence x. The latent representation (intermediate vector) z is fed to the LSTM decoder network 102 which produces a (realistic) target sentence (output sentence) y in language B with the same semantic meaning as the input sentence x provided to the encoder network 101.

Figure 2:
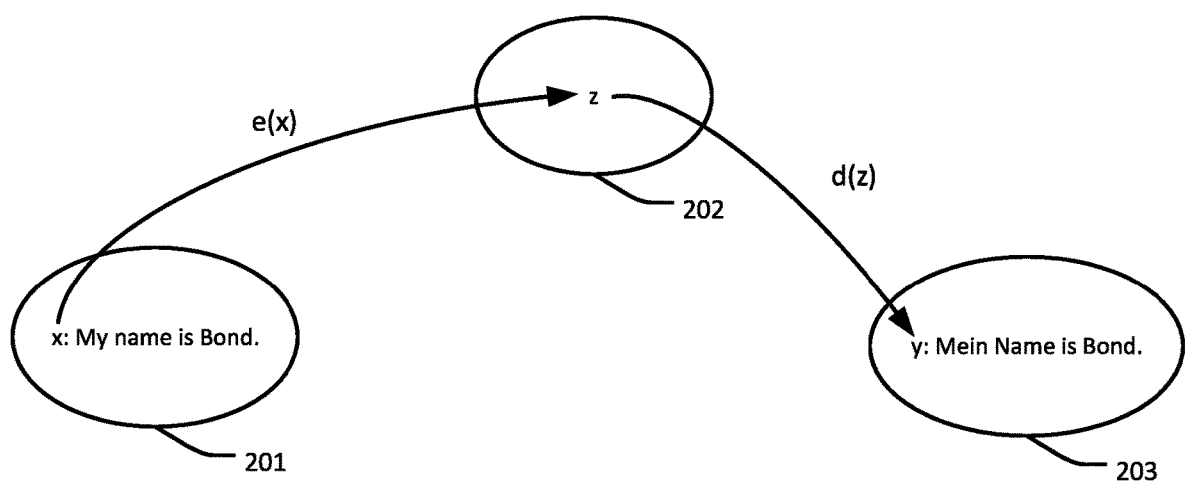
FIG. 2 shows an example application of the LSTM encoder/decoder network of FIG. 1.

FIG. 2 shows an example application of the LSTM encoder/decoder network of FIG. 1. The input sentence in language A (English) x: "My name is Bond", which lies within the set of sentences of language A 201, is mapped via the LSTM encoder network e(x) to a latent representation z which lies within the set of possible sentence embeddings (latent space) 202. The latent representation z is then fed to the LSTM decoder network d(z) which outputs the target sentence in language B (German) y: "Mein Name ist Bond.", which lies within the set of sentences of language B 203.

Figure 3:
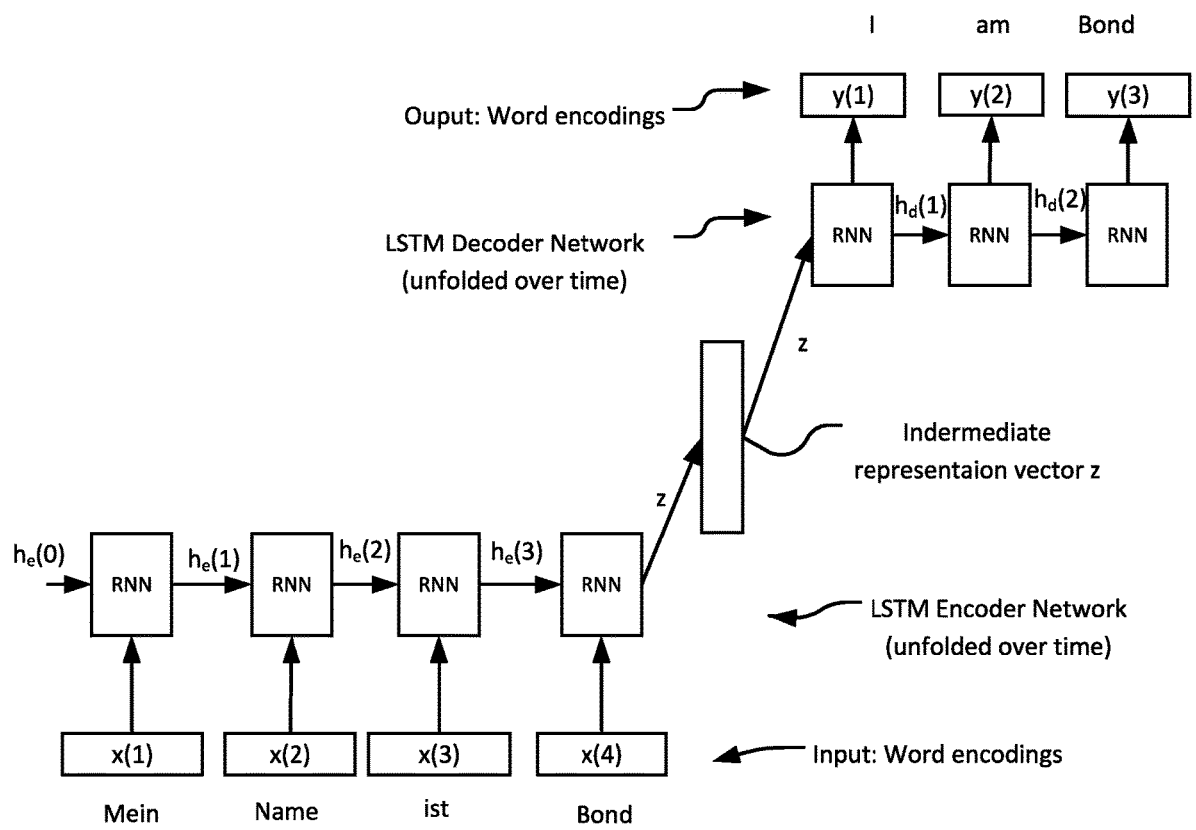
FIG. 3 shows in more detail the structure of the LSTM encoder/decoder network of FIG. 2.

FIG. 3 shows in more detail the structure of the LSTM encoder/decoder network of FIG. 2. FIG. 3 shows a recurrent LSTM network (RNN) which is unfolded in time. The encoder network is denoted as network e and the decoder (generator) network is denoted as network d. That means, the blocks shown in the encoder network e are all the same and the blocks shown in the decoder network d are all the same. At each time step i, the encoder RNN e accepts a single input vector x(i) of an input sequence x(1) to x(4), and computes a new hidden state $h_e(i)$ (the encoder hidden states are denoted as $h_e(i)$) from x(i) and $h_e(i-1)$ whereby the encoder hidden states change at every time step. Therefore, the latent vector (intermediate representation vector) z=e(x(1), x(2), x(3), x(4)) collects information from all x(1), ..., x(4). This latent vector (intermediate representation vector) z is fed to the decoder network d. At each time step i, the decoder network d accepts as an input vector the hidden state vector $h_d(i-1)$ (the decoder hidden states are denoted as $h_d(i)$) from the previous time step (i−1), starting with the latent vector (intermediate representation vector) z at time step zero.

At each time step the decoder network puts out an output word y(i).

The input element x(i) is an encoding of, for example, a word or punctuation symbol of an input sentence in input language A. The hidden states of the encoder network $h_e(i)$ are calculated using the standard propagation formula $$h_e(i) = f(W^{hh} h_e(i-1) + W^{hx} x(i))$$

where f is an activation function and $W^{hh}$ and $W^{hx}$ are corresponding weight matrices of the encoder network and i is the time index.

As a result z=e(x(1), x(2), x(3), x(4)) is latent vector (intermediate representation vector) that aims to encapsulate the information for all input elements of the input sentence in order to help the decoder network d make accurate predictions. Then, z is used as the initial hidden state $h_d(0)$ of the LSTM decoder network d. The decoder network d predicts, at a time step i, an output y(i) of an output sequence y(1) to y(3). At each time step i the decoder network d receives as an input $h_d(i)$ from the previous time step (i−1) which is used to calculate an output y(i), by using the propagation formula $$h_d(i)=f(W^{hh}h_d(i-1))$$

where f is an activation function and $W^{hh}$ is a corresponding weight matrix in the decoder network d. The outputs y(i) are calculated by using the hidden state of the decoder network $h_d(i)$ in the current time step i together with a corresponding weight $W^s$ matrix and for example a softmax-function which can be used to create a probability vector which will help determine the final output:

$$y_i=\text{softmax}(W^s h(i))$$

The softmax function is well known by the person skilled in the art and is a normalized exponential function.

An output element y(i) represents e.g. a word or punctuation symbol of an output sentence in the target language B. The complete output vector is denoted by d(z)=(y(1), y(2), y(3)).

The input sequence x(1) to x(4) can, for example, be encoded using a so called "one-hot encoding" process that is well known by the person skilled in the art. In one-hot encoding, each word is transformed into a vector representation.

Figure 4:
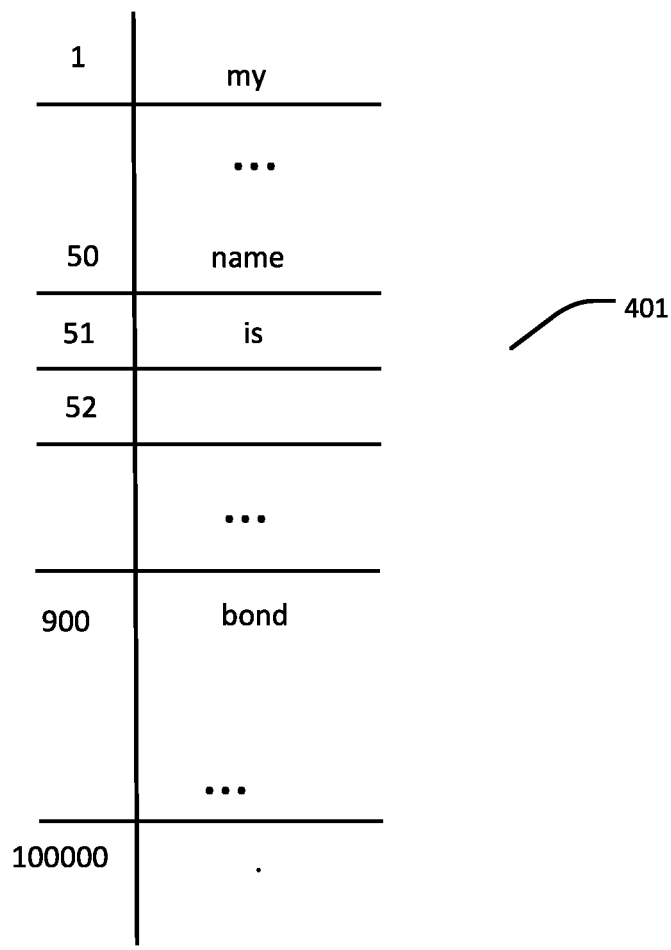
FIG. 4 shows a lookup table 401 which acts as a dictionary for encoding a sentence.

FIG. 4 shows a lookup table 401 which acts as a dictionary for encoding a sentence. The dictionary in this example has the size of 100000 predefined words, which are numbered from 1 to 100000. Here, for example, the word "my" is the first element of the dictionary and is thus attributed to the number 1, the word "name" is element 50 of the dictionary, the word "is" is element 51 of the dictionary, the word "bond" is element 900 of the dictionary, and the punctuation symbol "." is element 100000 of the dictionary.

In a "one-hot encoding" process the input sentence "My name is Bond." is parsed into its single words and punctuation "my", "name", "is", "bond", ".". These elements are then looked up in the dictionary and represented by vectors $x_1$ to $x_5$, where these vectors have the same dimension as the dictionary and where they have, as entries, zeros everywhere besides at the dimension where the word appears in the dictionary.

FIG. 5 shows the result of one-hot encoding the input sentence "My name is Bond." using the dictionary of FIG. 4. The word "My" is mapped to a vector with zeros everywhere, beside at dimension one which represents the position where the word appears in the dictionary. The word "name" is mapped to a vector with zeros everywhere, besides at dimension 50 which represents the position where the word appears in the dictionary. The word "is" is mapped to a vector with zeros everywhere, besides at dimension 51, the word "Bond" is mapped to a vector with zeros everywhere, besides at dimension 900, the punctuation element "." is mapped to a vector with zeros everywhere, besides at dimension 100000.

Each resulting vector x(1) to x(5) is fed to the input layer of a respective recurrent unit RNN as shown in FIG. 3, by mapping the vector elements to respective input neurons of the input layer of the RNN. To this end, the input layer of each RNN should have a number of input neurons which corresponds to the size of the dictionary used for one-hot encoding.

In FIGS. 4 and 5 a one-hot encoding process is described as an example for encoding sentences of an input language. Another possible encoding is for example the so called "word-to-vector embedding". Other encoding processes can be used.

Training with Parallel Corpora

The encoder/decoder networks e(x), d(z) may be trained jointly (i.e. the weight matrices of encoder and decoder are adapted), using a parallel corpus, to maximize the conditional probability of the target sequence given a source sequence, see for example Cho et al. in "Learning Phrase Representations using RNN Encoder-Decoder for Statistical Machine Translation", arXiv:1406.1078 [2014].

The LSTM encoder/decoder networks 101/102 are trained with parallel corpora, meaning that a training dataset with possible 1-to-1 correspondences between the input sentence x (for example provided in the form of a character sequence) and the desired target sentence y is used. No constraints on the output are imposed. In order to train the LSTM encoder network 101 and the LSTM decoder network 102, the conditional probability $$p(y|x;\theta)=\int p(y|z;\theta)p(z|x;\theta)dz$$

is maximized with respect to the network parameters θ (here the network weights W). During inference, p(y|x; θ) is maximized with respect to the target sentence y for a given input sentence x. Since the LSTM encoder/decoder networks (for example a recurrent neuronal network) 101, 102 are trained with a parallel corpus, a possible 1-to-1 correspondences between the input sentence x and the desired target sentence y is assumed. Therefore, the LSTM encoder/decoder networks 101, 102 learn for a given input sentence x which translation has the highest probability and is therefore to be output as the corresponding target sentence y. If trained with a parallel corpus, it is assumed that p(y|x; θ) is a unimodal distribution, meaning that for each input sentence x there is only one unique most probable output sentence y.

However, assuming a 1-to-1 correspondence between sentences of different languages is unrealistic, because p(y|x;θ) is typically a multi-modal distribution where one input sentence x can be translated into more than one target sentence y which all have the same meaning. Still further, sentences sometimes allow for different interpretations, so that there might exist several correct translations which do not necessarily have the same meaning.

Figure 6:
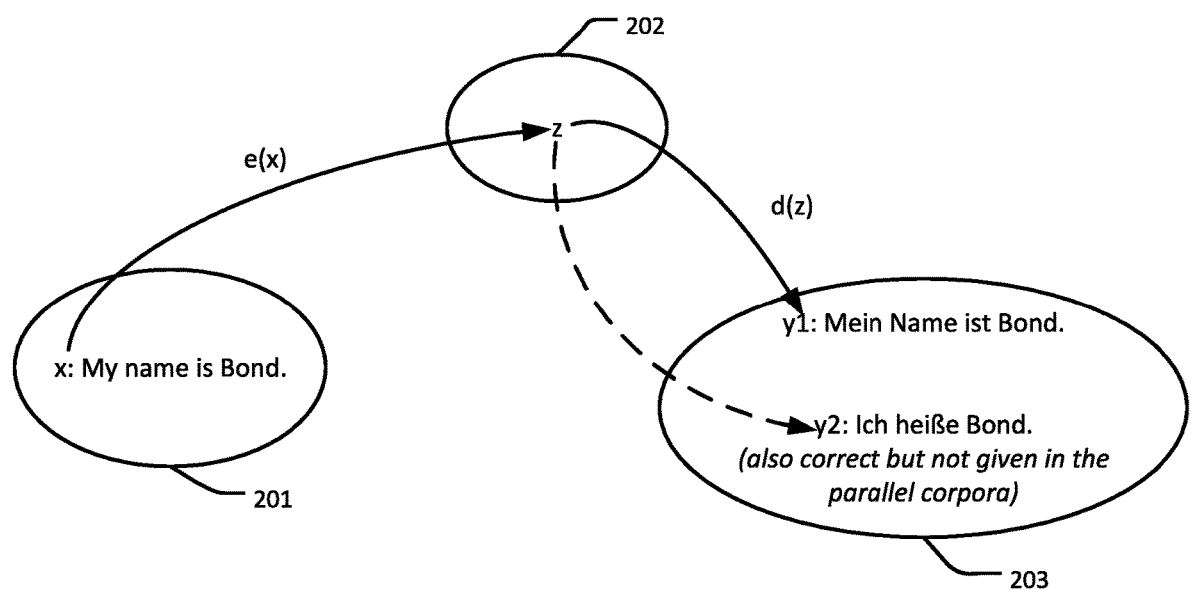
FIG. 6 shows an example in which an input sentence can be translated into two alternative target sentences.

FIG. 6 shows an example in which an input sentence can be translated into two alternative target sentences. The input sentence in language A (English) x: "My name is Bond", which lies within the set of sentences of language A 201, is mapped via the LSTM encoder network e(x) to a latent representation z which lies within the set of possible sentence embeddings 202. The latent representation z is then fed to the LSTM decoder network d(z) which outputs the target sentence y in language B (German) y: "Mein Name ist Bond.", which lies within the set of sentences of language B 203. The encoder/decoder e(x), d(z) have been trained with a parallel corpus assuming an unimodal distribution. Accordingly, they do not take into account that there exists an alternative target sentence y: "Ich heiße Bond." which is also a correct translation (i.e. it capture the meaning of the input sentence x) indicated by the dashed line. Today, there is no system to translate a sentence with multiple paraphrases which have the same meaning, but different linguistic properties.

Training with Monolingual Corpora

The following embodiments relate to machine translation systems that are trained with monolingual corpora and that take into account the multimodality of a natural language. In particular, conditions are applied which take into account the fact that, although target sentences might be correct translations, as demonstrated in FIG. 6 above, they typically differ in other properties. For example, target sentence y1: "Mein Name ist Bond." in the example of FIG. 6 has a length of four words and target sentence y2: "Ich heiße Bond." has only a length of three words.

Some embodiments described below in more detail take into account these properties and choose a specific output sentence y among different output sentences y under predefined conditions, for example according to the length (e.g. the shortest sentence). To this end, specific constraints are placed on the output sentence y. For example, one might be interested to constrain the length of the translated sentence y if subtitles are added to a movie because short sentences consume less space and can be displayed more easily.

Accordingly, some embodiments provide a translation system which makes use of the multimodality of $p(y|x;\theta)$ by imposing additional constraints on the output sentence y to tailor the target sentence to application specific needs.

Recent advances in the area of machine translation give the possibility to train machine learning systems using monolingual corpora only.

Figure 7:
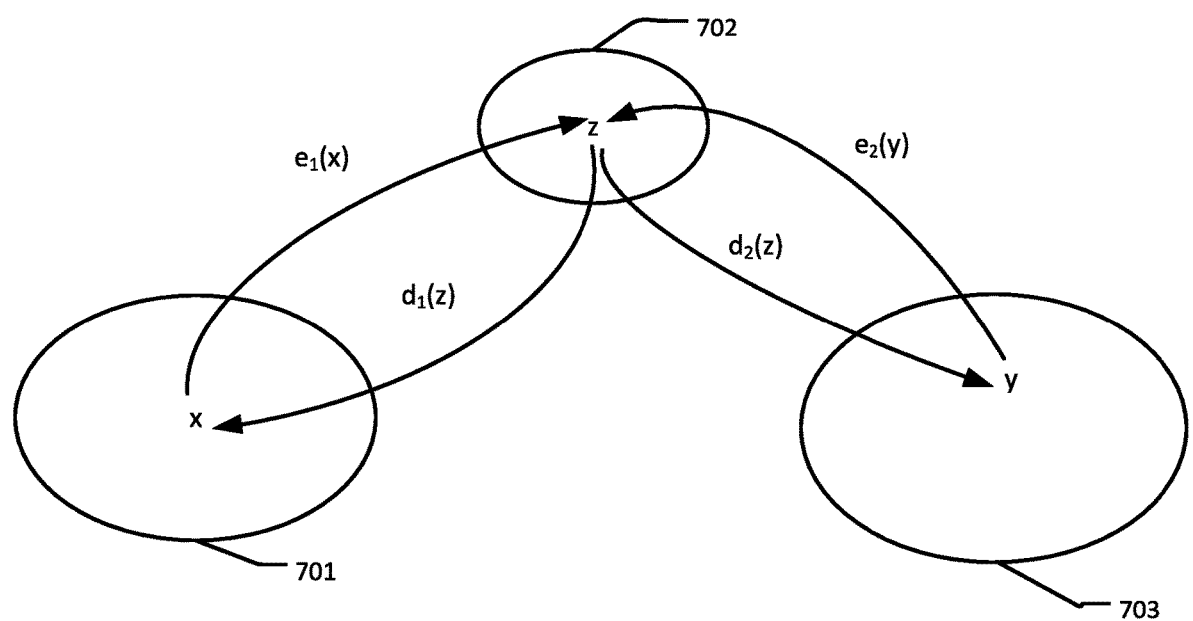
FIG. 7 shows a deep learning based machine translation system, comprising two encoder/decoder networks $e_1/d_1$ and $e_2/d_2$, one for each language that is trained with monolingual corpora.

FIG. 7 shows a deep learning based machine translation system, comprising two encoder/decoder networks $e_1/d_1$ and $e_2/d_2$, one for each language, that is trained with monolingual corpora. The first encoder/decoder pair $e_1/d_1$ is associated with language A 701, and the encoder/decoder pair $e_1/d_1$ is associated with language B 703. The first encoder/decoder network $e_1/d_1$ translates between a set of sentences of language A 701 and latent space 702, and the second encoder/decoder network $e_2/d_2$ translates between the latent space 702 and a set of sentences of language B 703. The encoder/decoder pair $e_1/d_2$ can be implemented as an LSTM encoder/decoder network as described in FIG. 3 and the corresponding description above. Likewise, the encoder/decoder pair $e_2/d_1$ can be implemented as an LSTM encoder/decoder network as described in FIG. 3 and the corresponding description above.

The encoder/decoder networks $e_1/d_1$ and $e_2/d_2$ are trained using two independent monolingual corpora, one for the set of sentences of language A 701, and one for the set of sentences of language B 703. Due to the fact, that two independent monolingual corpora are used instead of a parallel corpus, it is necessary to train the encoder/decoder network $e_1/d_1$ for translating the first language to the latent space and back and the encoder/decoder $e_2/d_2$ to translate the second language to the latent space and back. The first encoder $e_1$ is trained to map an input sentence x of language A to a respective latent representation $z=e_1(x)$ in latent space 702. The first decoder $d_1$ is trained to map the latent representation z back on the input sentence $x=d_1(z)$. The second encoder $e_2$ is trained to map a sentence y of language B to a respective latent representation $z=e_2(y)$ in latent space 702. The second decoder $d_2$ is trained to map the latent representation z back on the input sentence $y=d_2(z)$.

The machine translation system can take into account the multimodality of a natural language. Because the latent representation z captures the meaning of an input sentence x, two different input sentences x1 and x2 which have the same meaning may have the same latent representation z. Therefore, the mapping back via the decoder $d_1(z)$ may result in the same or a similar probability for two input sentences $d_1(z)=x1$ and $d_1(z)=x2$, which means that $p(y|x; \theta)$ may be a multimodal probability function.

The training of the machine translation system of FIG. 7 with two independent monolingual corpora, and in consideration of the multimodality of languages A and B, is described in more detail below.

The training can for example be done by applying a total loss-function L to the network, comprising four different loss-terms, namely a reconstruction loss-term $L_A$ for sentences of language A, a reconstruction loss-term $L_B$ for sentences of language B, a cross language loss-term $L_{CA}$ for sentences of language A after forward and backward translation, and a cross language loss-term $L_{CA}$ for sentences of language B after forward and backward translation.

The reconstruction loss-term for sentences of language A $L_A=L_A(x,d_1(e_1(x)))$ is configured to ensure that the first encoder/decoder network $e_1(x)/d_1(z)$ exactly reconstructs sentences from language A. This could be achieved by training the encoder/decoder network $e_1(x)/d_1(z)$ to map an input sentence x from the set of sentences of language A 701 (monolingual corpus of language A) via the encoder network $e_1(x)$ to a latent representation z and this latent representation z via the decoder network $d_1(z)$ back to the sentence of language A 701 resulting in a target sentence $x'=d_1(e_1(x))$ which is the exact reconstruction of the input sentence x.

The reconstruction loss-term for sentences of language B $L_B=L_B(y,d_2(e_2(y)))$ is configured to ensure that the second encoder/decoder network $e_2(x)/d_2(z)$ produces meaningful sentences from language B. This could be achieved by training the encoder/decoder network $e_2(x)/d_2(z)$ to map an input sentence y from the set of sentences of language B 703 (monolingual corpus of language B) via the encoder network $e_2(x)$ to a latent representation z and this latent representation z via the decoder network $d_2(z)$ back to the sentence of language B 703 resulting in a target sentence $y'=d_2(e_2(y))$ which is an exact reconstruction of the input sentence y.

The cross language loss-term $L_{CA}=L_{CA}(x,d_1(e_2(d_2(e_1(x)))))$ for sentences of language A after forward and backward translation should ensure that translating an input sentence x from language A to language B and back to language A, again results in a target sentence x' which is an exact reconstruction of the input sentence x. However, now x is reconstructed from a translated sentence y in language B. Therefore, $y=d_2(e_1(x))$ stores all the language independent meaning of x, while being formulated in a different language.

The cross language loss-term $L_{CB}=L_{CB}(y,d_2(e_1(d_1(e_2(y)))))$ for sentences of language B after forward and backward translation should ensure that translating an input sentence y from language B to language A and back to language B, again results in a target sentence y' which is an exact reconstruction of y. Therefore, $x=d_1(e_2(x))$ stores all the language independent meaning of y, while being formulated in a different language.

The total loss-function used to train the translation network (without constraints) is a linear combination of the above terms: $L=\gamma_1 L_A+\gamma_2 L_B+\gamma_3 L_{CA}+\gamma_4 L_{CB}$, where $\gamma_1$, $\gamma_2$, $\gamma_3$, and $\gamma_4$ are predefined weights which may be used to adjust the sensitivity of the total loss function L to each loss-term within the total loss-function L. They can for example be chosen all equal (for example $\gamma_1=\gamma_2=\gamma_3=\gamma_4=1$), or they may be adapted by the skilled person according to the specific application needs.

The specific loss functions $L_A$, $L_B$, $L_{CA}$, $L_{CB}$ can for example be chosen as disclosed by Lample et al. in "Unsupervised Machine Translation Using Monolingual Corpora Only", arXiv:1711.00043 [2018].

As already described above, in this case of training with monolingual corpora one can make use of the multimodality of $p(y|x; \theta)$ which means that it may be the case that one input sentence x translates into more than one probable target sentence y with the same meaning. Since the correspondences between the sentences is not explicitly given (like it could be in a parallel corpus) during training with a monolingual corpus, the training is achieved by learning in an unsupervised way. In contrast to the supervised training with a parallel corpus, in case of training with monolingual corpora it is not specified in which mode of $p(y|x; \theta)$ the translated target sentence y should lie in. Therefore, one can impose additional constraints on the target sentence y and thereby select among the multiple valid target sentences to select one specific target sentence that fulfills a predefined condition related to a specific application. Such constraints on the target sentence may for example be implemented by adding an additional penalty term $C=C(d_2(e_1(x))$ to the loss function L.

The total loss-function with penalty term reads as:

$$L=\gamma_1 L_A + \gamma_2 L_B + \gamma_3 L_{CA} + \gamma_4 L_{CB} + \gamma_5 C$$

As stated above, $\gamma_1$, $\gamma_2$, $\gamma_3$, $\gamma_4$, and $\gamma_5$ are predefined weights which may be used to adjust the sensitivity of the total loss function L. In particular, $\gamma_5$ determines the influence of the penalty term C within the total loss-function.

The encoder/decoder networks $e_1(x)/d_1(z)$ and $e_2(y)/d_2(z)$ are trained by adapting for example their weights according to the minimization of the total loss function L using standard error backpropagation techniques. At every training step of the network, two independent sentences, one from language A 701 and one from language B 703, are fed to the network and error backpropagation is performed.

Figure 8:
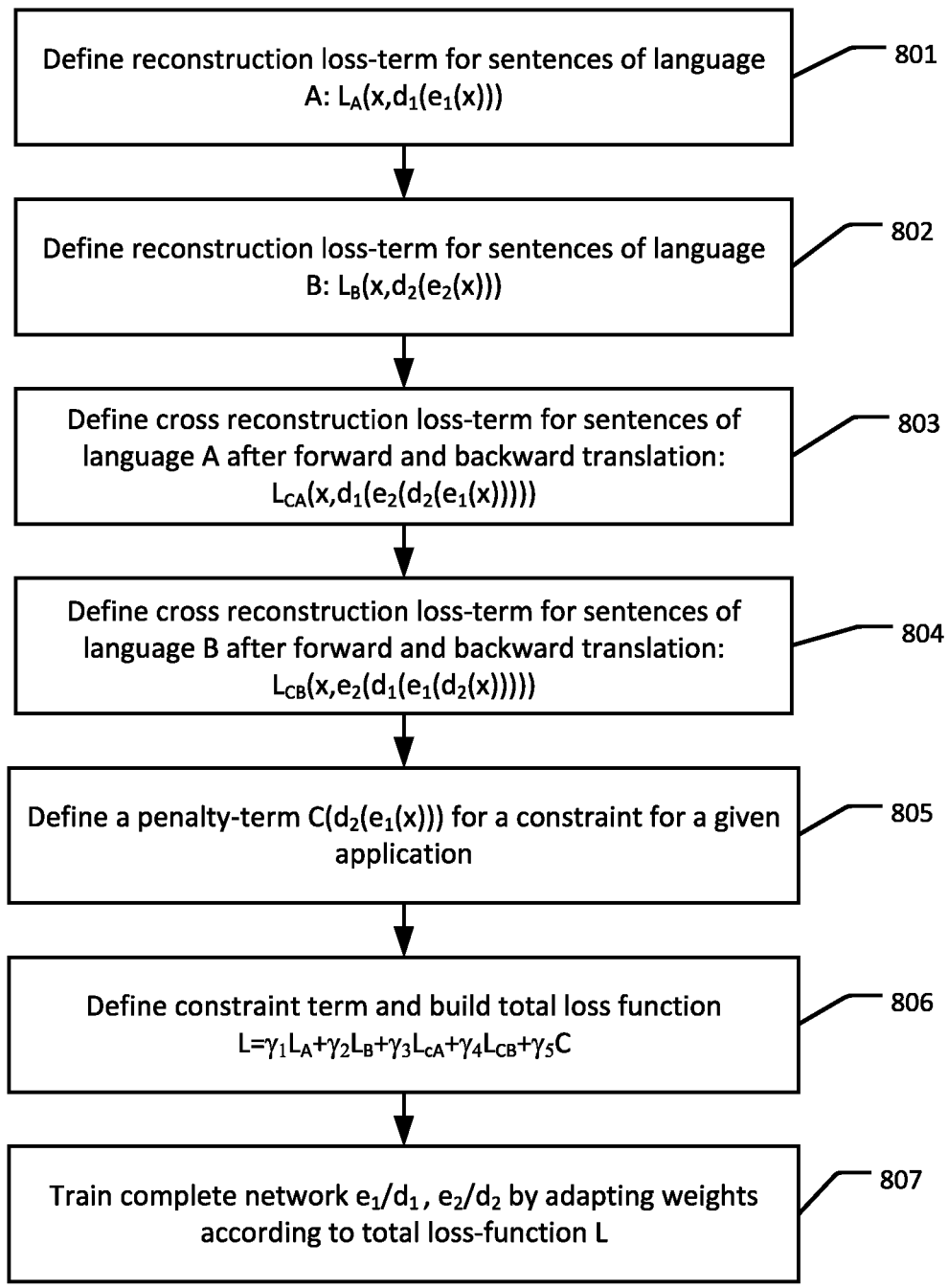
FIG. 8 shows a flow chart of the training process described e in FIG. 7.

FIG. 8 shows a flow chart of the training process described above. At 801, a reconstruction loss-term for sentences of language A: $L_A(x,d_1(e(_1(x)))$ is defined. At 802, a reconstruction loss-term for sentences of language B: $L_B(x,d_2(e(_2(x)))$ is defined. At 803, a cross reconstruction loss-term for sentences of language A after forward and backward translation: $L_{CA}(x,d_1(e_2(d_2(e_1(x)))))$ is defined. At 804, a cross reconstruction loss-term for sentences of language B after forward and backward translation: $L_{CB}(x,e_2(d_1(e_1(d_2(x)))))$ is defined. At 805, a penalty term $C(d_2(e_1(x)))$ for a constraint for a given application is defined. At 806, a constraint term is defined and the total loss function $L=\gamma_1 L_A + \gamma_2 L_B + \gamma_3 L_{CA} + \gamma_4 L_{CB} + \gamma_5 C$ is built. At 807, the complete network $e_1/d_1$, $e_2/d_2$ is trained by adapting weights according to total loss-function L.

During the training/adaptation phase the weights of the one or more encoder/decoder networks of deep learning based machine translation system are adapted to the specific usage of the deep learning based machine translation system for example with specific constraints.

In the embodiment above, at every training step of the network, two independent sentences, one from language A 701 and one from language B 703 are fed to the network and error backpropagation is performed. It can be split between optimization of the individual reconstruction losses $L_A$, $L_B$ or optimization of the cross language losses $L_{CA}$, $L_{CB}$. The reconstruction loss of language A and language B can be trained independently or in parallel to each other.

Figure 9:
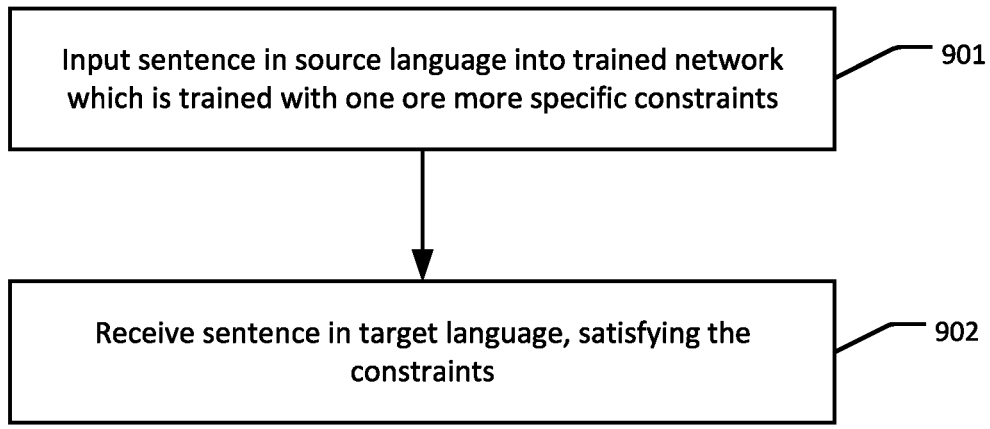
FIG. 9 shows a flow chart of deep learning based machine translation system in operational mode.

FIG. 9 shows a flow chart of deep learning based machine translation system in operational mode. Operational mode means that training phase has been finished and the encoder/decoder network is used to perform the actual translation, with one or more constraints. In 901, a sentence in source language is input into trained network which is trained with specific constraints. In 902, a sentence in target language is received which satisfies the constraints.

Translation with a Sentence Length Constraint

For the example of a translation with a sentence length constraint, the penalty term $C(d_2(e_1(x)))$ used during training of the network could, for example, be an indicator function which is zero if the number of characters in the translated sentence is smaller than a predefined maximum sentence length and which is infinity for all other sentence lengths.

Figure 10:
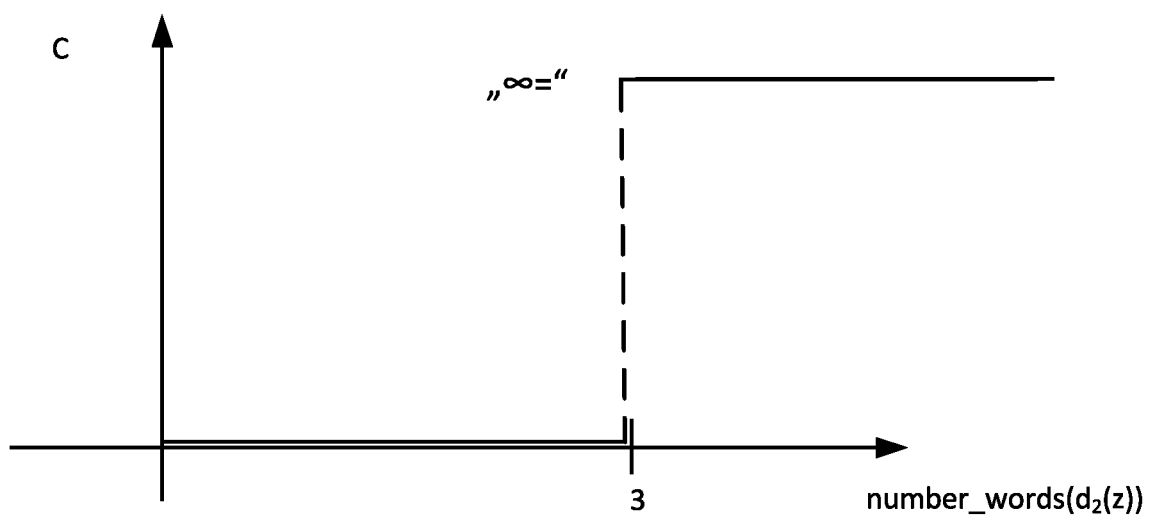
FIG. 10 shows a corresponding possible implementation of the penalty term C.

FIG. 10 shows a corresponding possible implementation of the penalty term C. The penalty term $C(d_2(e_1(x)))$ is chosen as follows, with $z=e_1(x)$:

$$C(d_2(z)) = \begin{cases} 0, & \text{if number of words of } d_2(z) \leq 3 \\ \infty, & \text{if number of words of } d_2(z) > 3 \end{cases}$$

In the graph of FIG. 10, the number of words of the target sentence $d_2(z)$ is shown on the x-axis and the corresponding value of the penalty term $C(d_2(e_1(x)))$ is shown on the y-axis. As shown in the graph, the penalty term takes the value 0 if the word length of the target-sentence y is less or equal than 3 and the penalty term C takes the value infinity if the target-sentence y is greater than 3.

Figure 11:
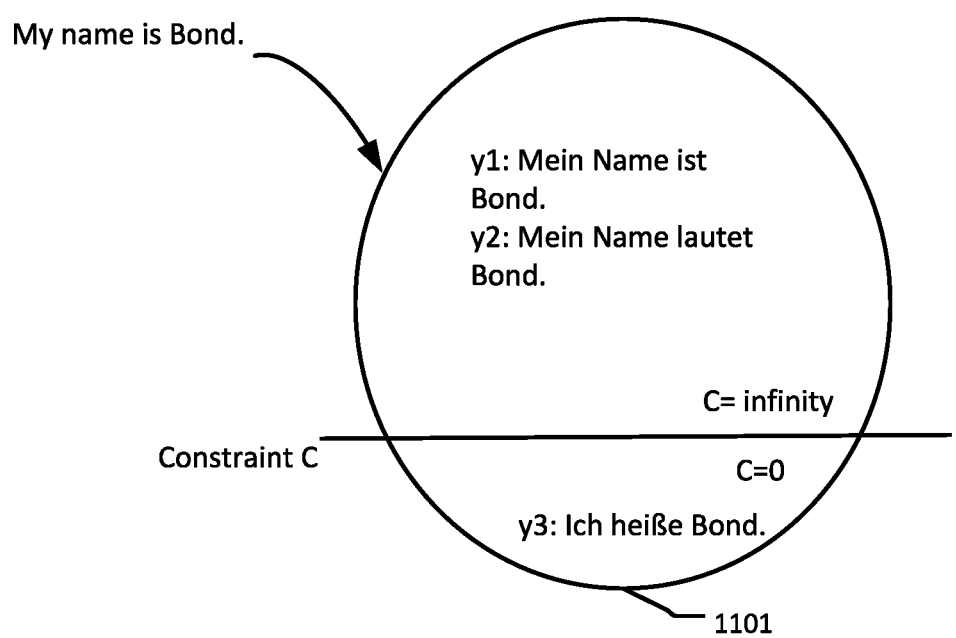
FIG. 11 shows schematically a set of possible sentences of target language B with a penalty term that implements a sentence length constraint.

FIG. 11 shows schematically a set of possible sentences of target language B 1101 with a penalty term that implements a sentence length constraint. The source sentence x: "My name is Bond." from source language A should be translated into the target language B using a network trained as described in FIG. 8. The set of possible sentences of target language B 1101 contains the target sentences y1: "Mein Name ist Bond.", y2: "Mein Name lautet Bond.", or y3: "Ich heiße Bond." which all are valid translations of source sentence x. The constraint described in FIG. 10 is set to impose that the length of the translated target sentence y should be less or equal than three words.

The value of the penalty term C takes the value zero if the word length of the target-sentence y is less than or equal to three and the penalty term C takes the value infinity if the target-sentence y is greater than three. Due to the training with the constraint C the probability of $p(y|x;\theta)$ near the mode where the translation constraint is fulfilled $(p(y3|x;\theta))$ is increased, and the mode where the translation constraint is not fulfilled $(p(y1|x;\theta), p(y2|x;\theta)$ is zero. Accordingly, target sentence y3: "Ich heiße Bond." will be selected by the network.

To place a constraint on the length of the output sentence y as described above could for example be desirable if subtitles are added to a movie, because short sentences consume less space and can be displayed more easily.

Figure 12:
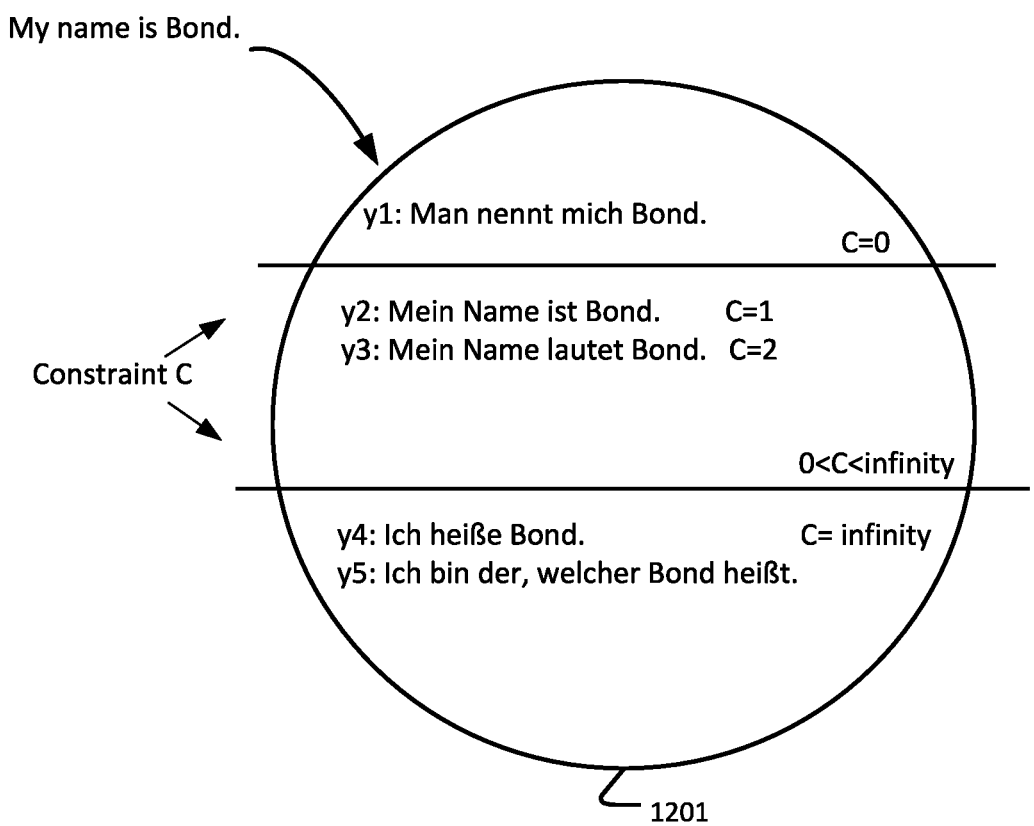
FIG. 12 shows schematically a set of possible sentences of target language B with a combination of penalty terms that implements a first constraint on the number of words in a sentence and a second constraint on the number of syllables in the sentence.

Translation with an Additional Constraint on the Number of Syllables in a Sentence FIG. 12 shows schematically a set of possible sentences of target language B 1201 with a combination of penalty terms that implements a first constraint on the number of words in a sentence and a second constraint on the number of syllables in the sentence. The sentence x: "My name is Bond." from source language A should be translated into the target language B using a network trained as described in FIG. 8 where a constraint is used that imposes similar visual appearance in terms of lip movements for the source sentence in language A and the target sentence in language B. This constraints on similar lip movement is imposed by applying both constraints, the constraint on the number of words and the constraints on the number of syllables in the output sentence. The set of possible sentences of target language B 1201 contains the sentences y1: "Man nennt mich Bond.", y2: "Mein Name ist Bond, y3: "Mein Name lautet Bond.", y4: "Ich heiße Bond." and y5: "Ich bin der, welcher Bond heißt.". All target sentences y1, y2, y3, y4 and y5 capture the meaning of the original input sentence x. The first constraint can for example be implemented by setting the value of a first penalty term $C_1$ to infinity if the number of words in the source sentence in language A is different from the number of words in the target sentence in language B and to zero if the number of words in the source sentence in language A is equal to the number of words in the target sentence in language B. This is the case for sentences y4 and y5. Still further, the value of a second penalty term $C_2$ which reflects the second constraint is set equal to the difference of the total number of syllables in the source sentence and the total number of syllables in the target sentence. Sentence y3 has in total 2 syllables more than the source sentence x therefore C=2 for sentence y3. The same goes with sentence y2 and y1, were C=1 and C=0, respectively. Due to training the network with the constraint C as explained above, the probability of $p(y|x;\theta)$ near the mode where the translation constraints are fulfilled is increased, that is, $p(y1|x;\theta)$, i.e. y1: "Man nennt mich Bond." is selected, which has the same number of words as the input sentence x: "My name is Bond." and which has the same number of syllables.

To place a constraint like the one explained above is for example important if a video is translated and a 1-to-1 correspondence of the lip movements to the spoken text is desired (i.e. the visual appearance in terms of lip movements should be similar).

Finding Alternative Formulations within a Language that Fulfill a Given Constraint (Sentence Paraphrasing)

In general, language A and language B do not have to be different but can also be the same. This can be useful in case that a sentence in language A does not meet a desired constraint and should be translated into a sentence in the same language A that meets the desired constraint. This may be used to find alternative formulations within the same language that fulfill the given constraint.

The training in this case is the same as explained above and the same structure and the same loss functions are used. The encoders of both networks might be the same. However, the decoders are different, because the second decoder network $d_2$ generates sentences which meet the constraint, whereas the decoder network $d_1$ generates sentences which are as close as possible to the sentences in the monolingual training dataset. The only difference is, that the monolingual training sets for language A and language B are the same dataset.

Other Applications

Many other constraints for various other applications are possible with the approach described above and in FIG. 7. For example, an alternative constraint could be that an input sentence should be translated in such a way that the target sentence can be represented as easily as possible using sign language. This means the expressibility of the target sentence with sign language should be optimized.

Another application is for example to translate an input sentence in such a way that the target sentence is easily recognized by Text-to-Speech-System (TTS) or can be easily read if used as text. This is can be done for example by minimizing the similarity to other sentences with different meaning in order to avoid confusion for the TTS.

Still further, another application is for example to use a constraint on the size of the vocabulary of language B i.e. to use only a subset of the words of language B as allowed words for the target sentence. This constraint may be used to obtain simple sentences as target sentence in the second language (language B) or rephrase sentences which contain words which are considered to be rude and are therefore not include in size-constrained vocabulary of language B.

Implementation

Figure 13:
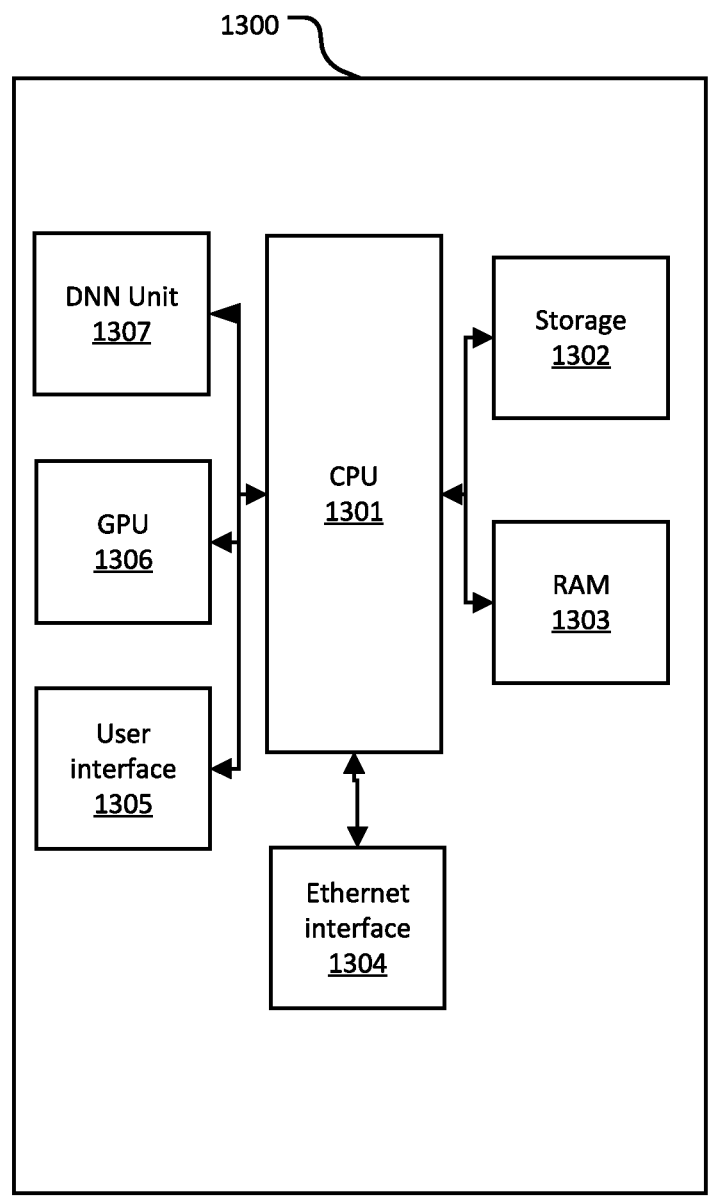
FIG. 13 schematically describes an embodiment of an electronic device which may implement the functionality of a deep learning based machine translation system that can impose constraints on results in the output language.

FIG. 13 schematically describes an embodiment of an electronic device which may implement the functionality of a deep learning based machine translation system that can impose constraints on results in the output language. The electronic device may further implement a process of training a encoder/decoder deep neural network (DNN) and machine translation using a DNN as described in the embodiments above, or a combination of respective functional aspects. The electronic device 1300 comprises a CPU 1301 as processor. The electronic device 1300 further comprises a GPU 1306 and deep neural network unit 1307 that are connected to the processor 1301. The DNN unit 1307 that may for example be a neural network on GPUs or any other hardware specialized for the purpose of implementing an artificial neural network which may for example implement the training or operation of the encoder/decoder DNN as described above. The electronic system 1300 further comprises an Ethernet interface 1304 which acts as interface for data communication with external devices. The electronic device 1300 further comprises a data storage 1302 and a data memory 1303 (here a RAM). The data memory 1303 is arranged to temporarily store or cache data or computer instructions for processing by the processor 1301. The data storage 1302 is arranged as a long term storage, e.g., for recording the monolingual corpora for the training of the encoder/decoder DNN. The data storage 1302 may also store data obtained from the DNN unit 1307.

It should be recognized that the embodiments describe methods with an exemplary ordering of method steps. The specific ordering of method steps is, however, given for illustrative purposes only and should not be construed as binding. For example steps 801, 802, 803 or 804 in FIG. 8 could be exchanged.

It should also be noted that the division of the electronic device of FIG. 13 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) A method comprising training a deep learning based translation system to translate an input sentence (x) from a first language (701) into a target sentence (y) in a second language (703), the training including a constraint (C) on the target sentence (y) in the second language (703).

(2) The method of (1), comprising training a first encoder/decoder pair ($e_1,d_1$) which is trained using a monolingual corpus for the first language, and a second encoder/decoder pair ($e_2, d_2$) which is trained using a monolingual corpus for the second language.

(3) The method of (1) or (2), comprising training the first encoder ($e_1$) to translate the input sentence (x) in the first language to a latent representation ($z=e_1(x)$), and the first decoder ($d_1$) to translate the latent representation ($z=e_1(x)$) back to the input sentence (x) in the first language.

(4) The method of (1) or (2), comprising training the second encoder ($e_2$) to translate the target sentence (y) in the second language to a latent representation ($z=e_2(y)$), and the second decoder ($d_2$) to translate the latent representation ($z=e_2(y)$) back to the target sentence (y) in the second language.

(5) The method of anyone of (1) to (4), comprising training the encoder/decoder pairs ($e_1, d_1$) and ($e_2/d_2$) using two independent monolingual corpora, one for the set of sentences of the first language (701), and one for the set of sentences of the second language (703).

(6) The method anyone of (1) to (5), wherein the encoder/decoder pairs are trained using a loss-function.

(7) The method of anyone of (1) to (6), wherein the loss-function comprises a reconstruction loss ($L_A(x, d_1(e_1(x)))$) for the sentences of the first language, which relates an input sentence (x) of the first language (701) to a resulting sentence ($d_1(e_1(x))$) of the first language (701), whereby, during training, the resulting sentence ($d_1(e_1(x))$) is obtained by the encoder network ($e_1$) translating the input sentence (x) to a latent representation ($e_1(x)$) and the decoder network ($d_1$) translating this latent representation ($e_1(x)$) back to the first language (701).

(8) The method of anyone of (1) to (7), wherein the loss-function comprises a reconstruction loss ($L_B(x, d_2(e_2(x)))$) for the sentences of the second language, which relates a target sentence (y) of the second language (703) to a resulting sentence ($d_2(e_2(y))$) of the second language (703), whereby, during training, the resulting sentence ($d_2(e_2(y))$) is obtained by the encoder network ($e_2$) translating the target sentence (y) to a latent representation ($e_2(y)$) and the decoder network ($d_2$) translating this latent representation ($e_2(y)$) back to the second language (703).

(9) The method of anyone of (1) to (8), wherein the loss-function comprises a cross-language loss ($L_{CA}(x, d_1(e_2(d_2(e_1(x)))))$) for sentences of the first language, which relates an input sentence (x) of the first language (701) to a resulting sentence ($d_1(e_2(d_2(e_1(x))))$) of the first language (701), whereby during training, the resulting sentence ($d_1(e_2(d_2(e_1(x))))$) is obtained by the encoder network ($e_1$) translating the input sentence (x) to a latent representation ($e_1(x)$), the decoder network ($d_2$) translating this latent representation ($e_1(x)$) to a target sentence ($d_2(e_1(x))$) in the second language (703), the encoder network ($e_2$) translating the target sentence ($d_2(e_1(x))$) to a latent representation ($e_2(d_2(e_1(x)))$) and the decoder ($d_1$) translating the latent representation ($e_2(d_2(e_1(x)))$) back to the first language (701).

(10) The method of anyone of (1) to (9), wherein the loss-function comprises a cross-language loss ($L_{CB}(y, d_2(e_1(d_1(e_2(y)))))$) for sentences of the second language, which relates a target sentence (y) of the second language (703) to a resulting sentence ($d_2(e_1(d_1(e_2(y))))$) of the second language (703), whereby, during training, the resulting sentence ($d_2(e_1(d_1(e_2(y))))$) is obtained by the encoder network ($e_2$) translating the target sentence (y) to a latent representation ($e_2(y)$), the decoder network ($d_1$) translating this latent representation ($e_2(y)$) to an input sentence ($d_1(e_2(y))$) in the first language (701), the encoder network ($e_1$) translating the input sentence ($d_1(e_2(y))$) to a latent representation ($e_1(d_1(e_2(y)))$) and the decoder ($d_2$) translating the latent representation ($e_1(d_1(e_2(y)))$) back to the second language (703).

(11) The method of anyone of (1) to (10), wherein multiple constraints (C) are imposed on the target sentence (y) in a second language (703).

(12) The method of anyone of (1) to (11), wherein a constraint (C) is imposed on the target sentence (y) in a second language (703) by using a penalty term.

(13) The method of anyone of (1) to (12), wherein the loss-function comprises a penalty term ($C(d_2(e_1(x)))$), the penalty term being imposed on a target sentence ($y=d_2(e_1(x))$) in the second language (703), whereby, during training, the target sentence ($y=d_2(e_1(x))$) is obtained by the encoder network ($e_1$) translating an input sentence (x) to a latent representation ($e_1(x)$) and the decoder network ($d_2$) translating this latent representation ($e_1(x)$) to the target sentence ($y=d_2(e_1(x))$).

(14) The method of anyone of (1) to (13), wherein the penalty term is realized by an indicator function.

(15) The method of anyone of (1) to (14), wherein the first language and the second language are different languages.

(16) The method of anyone of (1) to (15), wherein first language and the second language are the same language.

(17) The method of anyone of (1) to (16), wherein the constraint ($C(d_2(e_1(x)))$) on the target sentence ($y=d_2(e_1(x))$) in the second language (703) is based on the number of words in the target sentence ($y=d_2(e_1(x))$).

(18) The method of anyone of (1) to (17), wherein the constraint ($C(d_2(e_1(x)))$) on the target sentence (y) in the second language (703) is based on the number of syllables in the target sentence ($y=d_2(e_1(x))$).

(19) The method of anyone of (1) to (18), wherein the constraint ($C(d_2(e_1(x)))$) on the target sentence ($y=d_2(e_1(x))$) in the second language (703) relates to representability of the target sentence ($y=d_2(e_1(x))$) using sign language.

(20) The method of claim anyone of (1) to (19), wherein the constraint ($C(d_2(e_1(x)))$) on the target sentence ($y=d_2(e_1(x))$) in the second language (703) is that the target sentence ($y=d_2(e_1(x))$) has minimal similarity with other sentences with different meaning.

(21) The method of anyone of (1) to (20), wherein the constraint ($C(d_2(e_1(x)))$) on the target sentence ($y=d_2(e_1(x))$) in the second language (703) is that the target sentence ($y=d_2(e_1(x))$) uses only words from a predetermined subset set of the second language (703).

(22) An electronic device comprising circuitry trained to translate an input sentence (x) from a first language (701) into a target sentence (y) in second language (703), the training including a constraint (C) on the target sentence (y) in the second language (703).

(23) The electronic device of (22) wherein the circuitry comprises a deep learning based translation system.

(24) The electronic device of (22) or (23), wherein the deep learning based translation system comprises a first encoder/decoder pair ($e_1, d_1$) which is trained using a monolingual corpus for the first language, and a second encoder/decoder pair ($e_2,d_2$) which is trained using a monolingual corpus for the second language.

(25) The electronic device of anyone of (22) to (24), wherein the encoder/decoder pairs ($e_1,d_1$) and ($e_2/d_2$) are trained using two independent monolingual corpora, one for the set of sentences of the first language (701), and one for the set of sentences of the second language (703).

(26) The electronic device of anyone of (22) to (25), wherein the encoder/decoder neural networks are trained using a loss-function.

(27) The electronic device of anyone of (22) to (26), wherein the loss-function comprises a reconstruction loss ($L_A(x,d_1(e_1(x)))$) for the sentences of the first language, which relates an input sentence (x) of the first language (701) to a resulting sentence ($d_1(e_1(x))$) of the first language (701), whereby, during training, the resulting sentence ($d_1(e_1(x))$) is obtained by the encoder network ($e_1$) translating the input sentence (x) to a latent representation ($e_1(x)$) and the decoder network ($d_1$) translating this latent representation ($e_1(x)$) back to the first language (701).

(28) The electronic device of anyone of (22) to (27), wherein the loss-function comprises a reconstruction loss ($L_B(x,d_2(e_2(x)))$) for the sentences of the second language, which relates an target sentence (y) of the second language (703) to a resulting sentence ($d_2(e_2(y))$) of the second language (703), whereby, during training, the resulting sentence ($d_2(e_2(y))$) is obtained by the encoder network ($e_2$) translating the target sentence (y) to a latent representation ($e_2(y)$) and the decoder network ($d_2$) translating this latent representation ($e_2(y)$) back to the second language (703).

(29) The electronic device of anyone of (22) to (28), wherein the loss-function comprises a cross-language loss ($L_{CA}(x,d_1(e_2(d_2(e_1(x)))))$) for sentences of the first language, which relates an input sentence (x) of the first language (701) to a resulting sentence ($d_1(e_2(d_2(e_1(x))))$) of the first language (701), whereby during training, the resulting sentence ($d_1(e_2(d_2(e_1(x))))$) is obtained by the encoder network ($e_1$) translating the input sentence (x) to a latent representation ($e_1(x)$), the decoder network ($d_2$) translating this latent representation ($e_1(x)$) to a target sentence ($d_2(e_1(x))$) in the second language (703), the encoder network ($e_2$) translating the target sentence ($d_2(e_1(x))$) to a latent representation ($e_2(d_2(e_1(x)))$) and the decoder ($d_1$) translating the latent representation ($e_2(d_2(e_1(x)))$) back to the first language (701).

(30) The electronic device of anyone of (22) to (29), wherein the loss-function comprises a cross-language loss ($L_{CB}(y,d_2(e_1(d_1(e_2(y)))))$) for sentences of the second language, which relates a target sentence (y) of the second language (703) to a resulting sentence ($d_2(e_1(d_1(e_2(y))))$) of the second language (703), whereby, during training, the resulting sentence ($d_2(e_1(d_1(e_2(y))))$) is obtained by the encoder network ($e_2$) translating the target sentence (y) to a latent representation ($e_2(y)$), the decoder network ($d_1$) translating this latent representation ($e_2(y)$) to an input sentence ($d_1(e_2(y))$) in the first language (701), the encoder network ($e_1$) translating the input sentence ($d_1(e_2(y))$) to a latent representation ($e_1(d_1(e_2(y)))$) and the decoder ($d_2$) translating the latent representation ($e_1(d_1(e_2(y)))$) back to the second language (703).

(31) The electronic device of anyone of (22) to (30), wherein multiple constraints (C) are imposed on the target sentence (y) in a second language (703).

(32) The electronic device of anyone of (22) to (31), wherein a constraint (C) is imposed on the target sentence (y) in a second language (703) by using a penalty term.

(33) The electronic device of anyone of (22) to (32), wherein the loss-function comprises a penalty term ($C(d_2(e_1(x)))$), the penalty term being imposed on a target sentence ($y=d_2(e_1(x))$) in the second language (703), whereby, during training, the target sentence ($y=d_2(e_1(x))$) is obtained by the encoder network ($e_1$) translating an input sentence (x) to a latent representation ($e_1(x)$) and the decoder network ($d_2$) translating this latent representation ($e_1(x)$) to the target sentence ($y=d_2(e_1(x))$).

(34) The electronic device of anyone of (22) to (33), wherein the penalty term is realized by an indicator function.

(35) The electronic device of anyone of (22) to (34), wherein the first language and the second language are different languages.

(36) The electronic device of anyone of (22) to (35), wherein first language and the second language are the same language.

(37) The electronic device of anyone of (22) to (36), wherein the constraint ($C(d_2(e_1(x)))$) on the target sentence ($y=d_2(e_1(x))$) in the second language is based on the number of words in the target sentence ($y=d_2(e_1(x))$).

(38) The electronic device of anyone of (22) to (37), wherein the constraint ($C(d_2(e_1(x)))$) on the target sentence (y) in the second language is based on the number of syllables in the target sentence ($y=d_2(e_1(x))$).

(39) The electronic device of anyone of (22) to (38), wherein the constraint ($C(d_2(e_1(x)))$) on the target sentence ($y=d_2(e_1(x))$) in the second language (703) relates to the target sentence ($y=d_2(e_1(x))$) being visualizable as easily as possible using a sign language.

(40) The electronic device of anyone of (22) to (39), wherein the constraint ($C(d_2(e_1(x)))$) on the target sentence ($y=d_2(e_1(x))$) in the second language (703) is, the target sentence ($y=d_2(e_1(x))$) having minimal similarity with other sentences with different meaning.

(41) The electronic device of anyone of (22) to (40), wherein the constraint ($C(d_2(e_1(x)))$) on the target sentence ($y=d_2(e_1(x))$) in the second language (703) is that the target sentence ($y=d_2(e_1(x))$) uses only words from a predetermined subset set of the second language (703).

The invention claimed is:
1. A method, comprising:
training a deep learning based translation system to translate an input sentence from a first language into a target sentence in a second language, the training including a constraint on the target sentence in the second language,
wherein encoder/decoder pairs are trained using a loss-function,
wherein the loss-function comprises a reconstruction loss for sentences of the first language, which relates an input sentence of the first language to a resulting sentence of the first language, whereby, during training, the resulting sentence is obtained by an encoder network translating the input sentence to a latent repre- sentation and a decoder network translating this latent representation back to the first language.

2. The method of claim 1, comprising training a first encoder/decoder pair which is trained using a monolingual corpus for the first language, and a second encoder/decoder pair which is trained using a monolingual corpus for the second language.

3. The method of claim 2, comprising training the first encoder to translate the input sentence in the first language to a latent representation, and the first decoder to translate the latent representation back to the input sentence in the first language.

4. The method of claim 2, comprising training the second encoder to translate the target sentence in the second language to a latent representation, and the second decoder to translate the latent representation back to the target sentence in the second language.

5. The method of claim 2, comprising training the encoder/decoder pairs and using two independent monolingual corpora, one for the set of sentences of the first language, and one for the set of sentences of the second language.

6. The method of claim 1, wherein the loss-function comprises a reconstruction loss for sentences of the second language, which relates a target sentence of the second language to a resulting sentence of the second language, whereby, during training, the resulting sentence is obtained by the encoder network translating the target sentence to a latent representation and the decoder network translating this latent representation back to the second language.

7. The method of claim 1, wherein the loss-function comprises a cross-language loss for sentences of the first language, which relates an input sentence of the first language to a resulting sentence of the first language, whereby during training, the resulting sentence is obtained by the encoder network translating the input sentence to a latent representation, the decoder network translating this latent representation to a target sentence in the second language, the encoder network translating the target sentence to a latent representation and the decoder translating the latent representation back to the first language.

8. The method of claim 1, wherein the loss-function comprises a cross-language loss for sentences of the second language, which relates a target sentence of the second language to a resulting sentence of the second language, whereby, during training, the resulting sentence is obtained by the encoder network translating the target sentence to a latent representation, the decoder network translating this latent representation to an input sentence in the first language, the encoder network translating the input sentence to a latent representation and a decoder translating the latent representation back to the second language.

9. The method of claim 1, wherein multiple constraints are imposed on the target sentence in a second language.

10. The method of claim 1, wherein a constraint is imposed on the target sentence in a second language by using a penalty term.

11. The method of claim 1, wherein the loss-function comprises a penalty term, the penalty term being imposed on a target sentence in the second language, whereby, during training, the target sentence is obtained by the encoder network translating an input sentence to a latent representation and the decoder translating this latent representation to the target sentence.

12. The method of claim 11, wherein the penalty term is realized by an indicator function.

13. The method of claim 1, wherein the first language and the second language are different languages.

14. The method of claim 1, wherein first language and the second language are the same language.

15. The method of claim 1, wherein the constraint on the target sentence in the second language is based on the number of words in the target sentence.

16. The method of claim 1, wherein the constraint on the target sentence in the second language is based on the number of syllables in the target sentence.

17. The method of claim 1, wherein the constraint on the target sentence in the second language relates to representability of the target sentence using sign language.

18. The method of claim 1, wherein the constraint on the target sentence in the second language is that the target sentence has minimal similarity with other sentences with different meaning.

19. The method of claim 1, wherein the constraint on the target sentence in the second language is that the target sentence uses only words from a predetermined subset set of the second language.

20. An electronic device, comprising:
circuitry trained to translate an input sentence from a first language into a target sentence in second language, the training including a constraint on the target sentence in the second language,
wherein encoder/decoder pairs are trained using a loss-function,
wherein the loss-function comprises a reconstruction loss for sentences of the first language, which relates an input sentence of the first language to a resulting sentence of the first language, whereby, during training, the resulting sentence is obtained by an encoder network translating the input sentence to a latent representation and a decoder network translating this latent representation back to the first language.

* * * * *